June 9, 1953 — G. E. MOORE — 2,641,520
FISHING TACKLE BOX

Filed Feb. 24, 1950 — 4 Sheets-Sheet 1

INVENTOR.
GEORGE E. MOORE.
BY
Thos. S. Donnelly
ATTORNEY.

June 9, 1953 G. E. MOORE 2,641,520
FISHING TACKLE BOX
Filed Feb. 24, 1950 4 Sheets-Sheet 2

INVENTOR.
GEORGE E. MOORE.
BY
ATTORNEY.

June 9, 1953  G. E. MOORE  2,641,520
FISHING TACKLE BOX

Filed Feb. 24, 1950  4 Sheets-Sheet 3

INVENTOR:
GEORGE E. MOORE.
BY
Thos S Donnelly
ATTORNEY.

June 9, 1953 G. E. MOORE 2,641,520
FISHING TACKLE BOX

Filed Feb. 24, 1950 4 Sheets-Sheet 4

INVENTOR.
GEORGE E. MOORE.
BY
ATTORNEY.

Patented June 9, 1953

2,641,520

UNITED STATES PATENT OFFICE 2,641,520

FISHING TACKLE BOX

George E. Moore, Detroit, Mich.

Application February 24, 1950, Serial No. 146,092

6 Claims. (Cl. 312—291)

My invention relates to a new and useful improvement in a fishing tackle box.

It is an object of the present invention to provide a fishing tackle box so arranged and constructed that it will carry a maximum amount of tackle in such a manner that various sections of the box may be made accessible to the user without dislocating the tackle in other sections of the box.

Another object of the invention is the provision of a fishing tackle box having a plurality of compartments in which different types of fishing tackle may be positioned and each compartment being covered with a cover when the box is in closed position, so as to retain the various items in the individual compartments in which positioned.

Another object of the invention is the provision of a fishing tackle box having a maximum number of compartments and spaces in which various kinds of tackle may be stored, while at the same time the box may be maintained compact and light.

Other objects will appear hereinafter.

In the drawings I have illustrated the preferred form of construction, but it is recognized that various modifications and changes may be made without departing from the invention itself.

Forming a part of this specification are drawings in which.

Figures 1, 2:
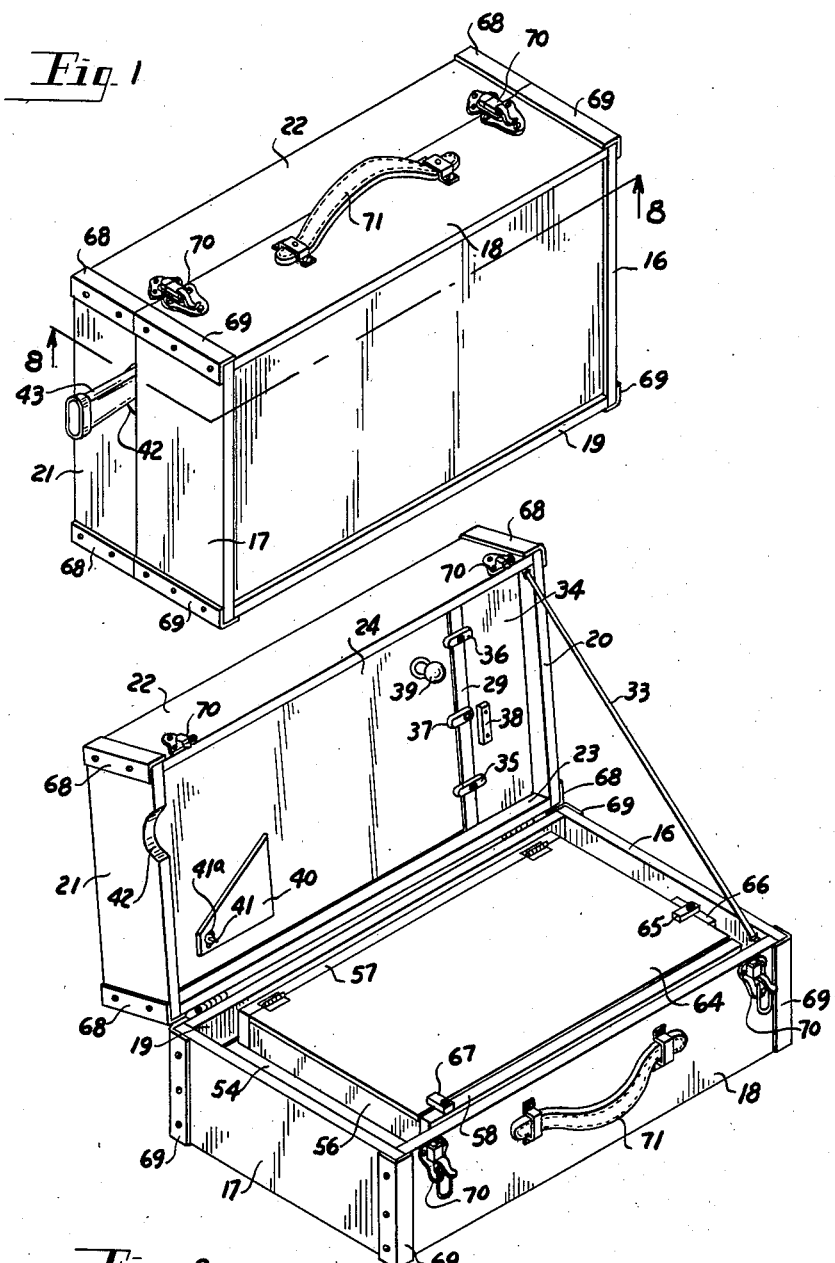
Fig. 1 is a perspective view of the invention, showing it in closed position.
Fig. 2 is a perspective view of the invention, showing the two main sections in open position.
Figure 3:
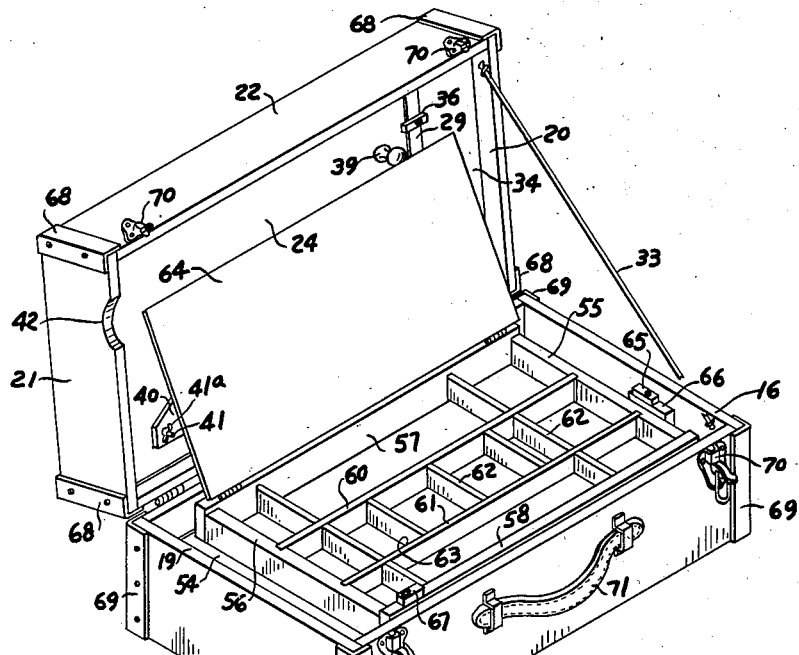
Fig. 3 is a view similar to Fig. 2, showing a cover moved to open position.

As shown in the drawings, I have provided a pair of main sections, one of said sections comprising the oppositely disposed end walls 16 and 17 and the oppositely disposed side walls 18 and 19. The other section, which is hingedly connected to the section just described, embodies the oppositely disposed end walls 20 and 21 and the oppositely disposed side walls 22 and 23. Hingedly connected on the end wall 21 is a cover or door 24, swingable on the hinges 25. Positioned in the section to which the door 24 is connected is a partition 26 dividing this section into the pair of compartments 27 and 28. This partition 26 extends to the transverse partition 29, which cooperates with the partition 30 to provide a compartment 31 and a compartment 32. This section on which the door 24 is hingedly mounted may be termed the upper section, and the other section may be termed the lower section. These two sections are connected by the flexible member 33 so as to limit the swinging of the sections relatively to each other from closed position to open position. A plate 34 serves as a closure for the compartments 31 and 32 and is retained in position by the keepers 35 and 36, which also serve to overlie the edge of the door 24 and retain it in closed position. An additional keeper 37 also overlies the edge of the door 24 for retaining it in closed position, all of these keepers being pivotally mounted on the face of the partition 29. Mounted on the closure plate 34 is a block 38, which serves as a hand grip. A knob 39 is mounted on the door 24 and projects outwardly therefrom and serves as a hand grip and also as an abutment member. Mounted on the face of the door 24 is a plate 40, which is retained in position by means of the bolt 41 provided with the thumb nut 41a, which will provide a means for clamping against the face of the closure or door 24 any suitable piece of equipment such as a gaff hook or the like. The end wall 21 is provided with a notch or recess 42 through which may project the handle of a short landing net, which may be positioned to lie against the surface of the door 24. This handle 43 projects outwardly from the outer face of the wall 21, as clearly shown in Fig. 1.

Figure 4:
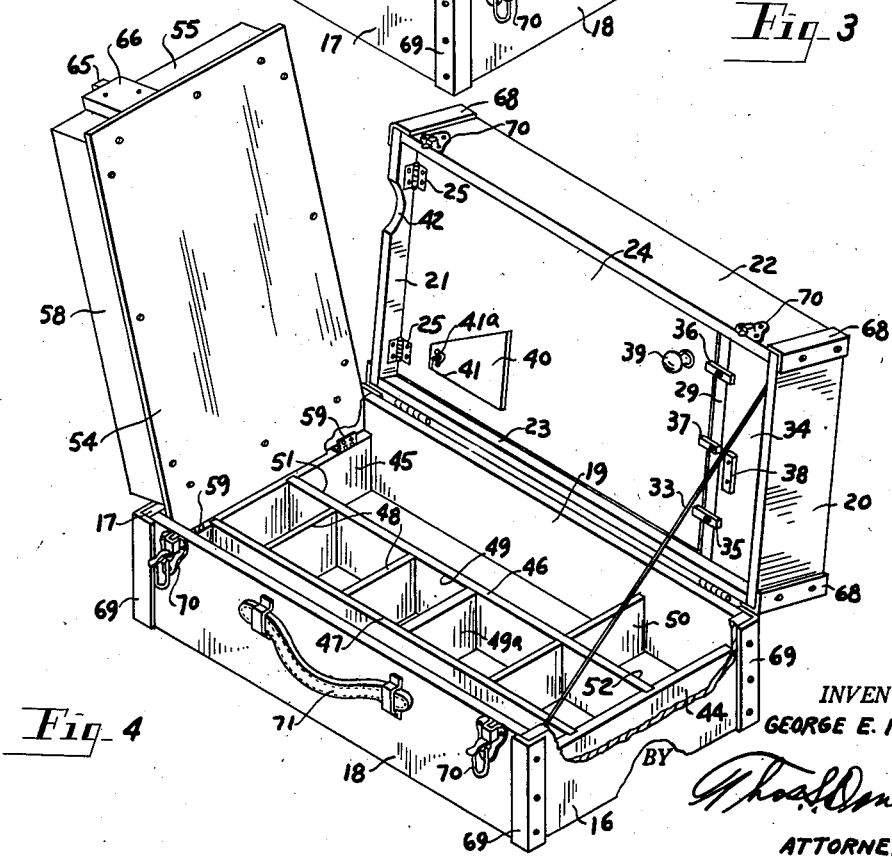
Fig. 4 is a view similar to Fig. 3, with a part broken away and showing a compartment-bearing portion swung to uncovering position.
Figure 5:
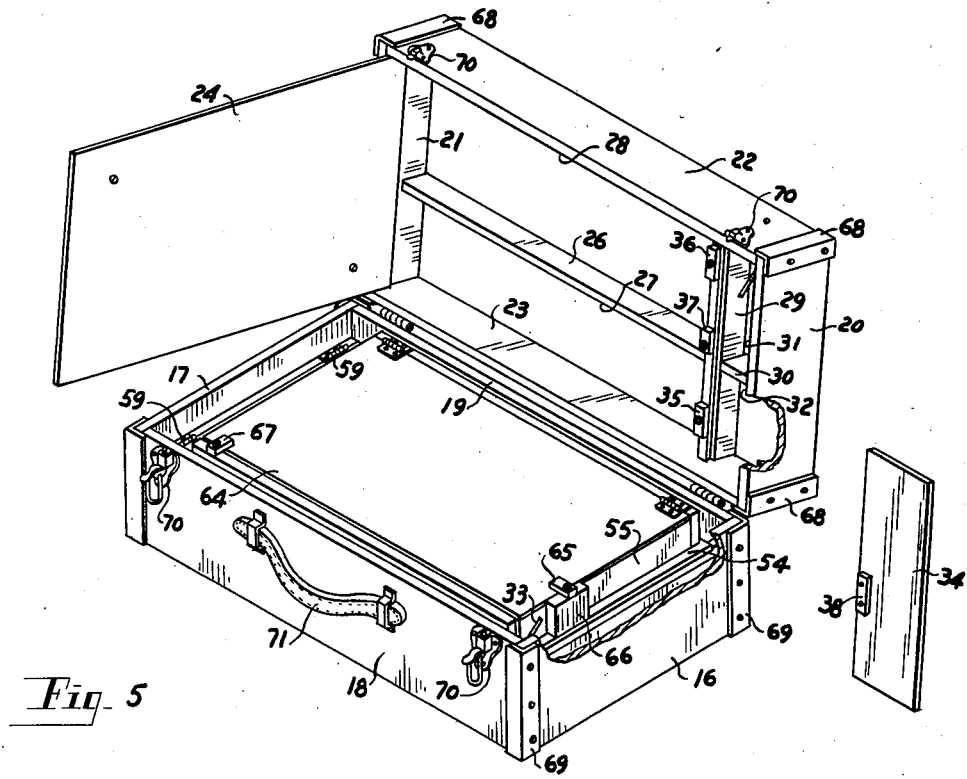
Fig. 5 is a view similar to Fig. 2, with one of the covers swung to open position and with a part broken away.

Mounted within the lower section so as to lie against the inner face of the side wall 16, as shown in Fig. 4, is a transverse partition 44, and a similar plate 45 is positioned within the lower section lying against the inner face of the end wall 17. Extending between these plates 44 and 45 is a central, longitudinally directed partition 46 cooperating with the transversely extending partition 48 to provide a plurality of separate compartments 49 which lie on one side of the longitudinal medial line of the lower section. An elongated partition 49a lies on the opposite side of the longitudinal medial line of the lower section and is divided by the partition 50 to provide at the end of the longer compartment 49a the small compartment 52. All of these partitions 46, 48, and 50 are of less height than the depth of the lower section, so that the upper faces of these partitions are located well below the upper edge of the lower section. Swingably mounted on the plate 45 is a cover plate 54 which, when swung downwardly into the position shown in Fig. 2 or 5, will serve to lie upon the upper faces of the partitions 46, 48 and 50 and close the various compartments. This cover plate 54 also serves as a bottom for a box which embodies the end walls 55 and 56 and the side walls 57 and 58, the bottom 54 projecting beyond the end walls 55 and 56 and being hinged at its edges by the hinges 59. Consequently, the box having the bottom 54 is of less length than the length of the lower section but is of the same width, so that it snugly seats in the lower section. The partitions upon which this swingable box rests are of such height that combined with the height of the swingable box, the upper faces of the walls 55, 56, 57, and 58 of the swingable box lie flush with the upper face of the walls 16, 17, 18, and 19 of the lower section. Mounted in this swingable box is a pair of longitudinally directed partitions 60 and 61 which cooperate with the transverse partition 62 to provide a plurality of compartments 63 of various sizes. Swingably mounted on the side wall 57 is a cover 64 which serves as a cover for the compartments. These partitions 60, 61, and 62 are of the same height as the end walls 55 and 56, which are of slightly less height than the side walls 57 and 58, so that when the cover 64 is in closing position, the outer face of the cover 64 will lie flush with the faces of the side walls 57 and 58 and lie snugly upon the upper faces of the end walls 55 and 56 as well as the faces of the partitions 60, 61, and 62, thus securely closing the various compartments. A keeper 65 is swingably mounted on the block 66 which is secured to the end wall 16, and a keeper 67 is swingably mounted on the side wall 58 so that the cover 64 may thus be secured in closed position.

The corners of the upper section are reenforced with the metal angle plates 68, and similar metal angle plates 69 reenforce the corners of the lower section. The two sections are secured together by the clamps 70, and the lower section is provided with the handle 71 which serves as a means for carrying the box when in the closed position shown in Fig. 1.

Figure 8:
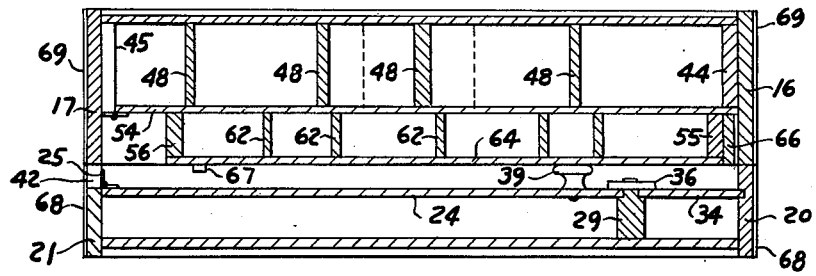
Fig. 8 is a sectional view taken on line 8—8 of Fig. 1.

It is evident from Fig. 8 that the surface of the door or closure 24 as well as the closure 34 terminate with the outer faces positioned inwardly from the faces of the walls 20, 21, 22, and 23, so that there is a space between the opposing faces of the members 64 and 24 when the structure is in closed position. It will, however, be noted that the knob 39 serves as an abutment to engage the face of the closure or door 64 so that the strain on the various keepers is thus released and the engagement of this knob 39 with the door prevents any tendency of the parts to move when the upper and lower sections are closed.

Figure 6:
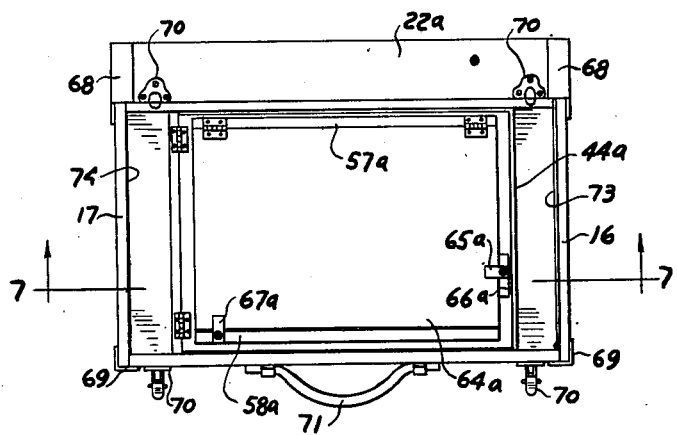
Fig. 6 is a top plan view of the form shown in Fig. 2, illustrating a slight modification.
Figure 7:
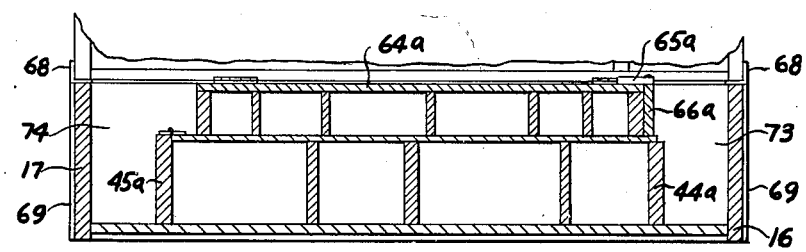
Fig. 7 is a sectional view taken on line 7—7 of Fig. 6.

In Fig. 6 and Fig. 7 I have shown a slight modification which takes place in the lower section where, instead of having the partition or plate 44 engaging the inner face of the wall 16, I have substituted the plate 44a, which is spaced apart inwardly from the end wall 16 to provide the compartment 73. Likewise, the plate 45 is substituted for by the plate 45a, which is spaced inwardly to provide the compartment 74, a box embodying the side walls 57a, 58a, the swingable cover 64a, and the keepers 65a and 67a, the keepers 65a being swingably mounted on the block 66a. In this manner, the compartments 73 and 74 are exposed immediately upon opening the lower and upper sections so that if desired, the user may position in the compartments 73 and 74 that part of tackle which is always used.

By providing these various compartments and constructing the upper and lower sections in the manner already described, it is obvious that various parts of the fishing tackle may be stored in the various compartments, the sections of the fishing pole and other elongated parts being stored in the longer compartment, whereas the smaller compartments are provided for smaller pieces of fishing tackle.

Experience has shown that a fishing tackle box constructed in this manner is most efficient in use, as it renders all of the tackle easily and quickly accessible to the user, while at the same time the tackle does not become mixed up while the person is fishing over an extended period of time.

What I claim is:

1. A fishing tackle box of the class described, a box-like structure open at one end; a plurality of partitions in said box-like structure for dividing the same into a plurality of compartments, said partitions being of less height and depth than said box and terminating at their edges below the edges of said box; a cover swingably mounted on one of said partitions and swingable downwardly into closing position for closing said compartments; a box-like structure mounted on the outer face of said cover plate, said cover plate forming the bottom of said last named box-like structure; a plurality of partitions in said last named box-like structure dividing the same into a plurality of compartments; and a cover swingably mounted on said last named box-like structure for lying upon said partitions and closing said compartments, said cover being adapted for lying flush with the upper edges of said first named box-like structure.

2. In a fishing tackle box of the class described a pair of box-like sections open at one of their ends and hingedly connected together along one of the edges of the open end and foldable upon each other to provide an enclosed container; a plurality of partitions in one of said sections for dividing the same into separate compartments, said partitions terminating at their outer faces inwardly from the faces of said section; a cover plate swingably mounted on one of said partitions and swingable to lie in engagement with the end faces of said partitions for closing said compartments; a box-like structure mounted on the outer face of said cover plate, said cover plate forming the bottom of said last named box-like structure; a plurality of partitions in said last named box-like structure for dividing the same into a plurality of separate compartments; a swingable cover on said last named box-like structure for closing said compartments, said cover being adapted for lying, upon swinging of said cover plate into closing position, with its outer face flush with the end faces of said section; a plurality of compartments in the other of said sections; a closure for closing the compartments in said other section and swingably mounted on said other section; and an abutment member carried on said last named closure and adapted for engaging said second named cover upon folding of said sections into closing position.

3. In a fishing tackle box of the class described, a pair of box-like sections open at one of their ends and hingedly connected together along one of the edges of the open end and foldable upon each other to provide an enclosed container; a plurality of partitions in one of said sections for dividing the same into separate compartments, said partitions terminating at their outer faces inwardly from the end of the face of said section; a cover plate swingably mounted on one of said sections and swingable to lie in engagement with the end faces of said partitions for closing said compartments; a box-like structure mounted on the outer face of said cover plate, said cover plate forming the bottom of said last named box-like structure; a plurality of partitions in said last named box-like structure for dividing the same into a plurality of separate compartments; a swingable cover on said last named box-like structure for closing said compartments, said cover being adapted for lying, upon swinging of said cover plate into closing position, with its outer face flush with the end faces of said section; a plurality of partitions in the other of said sections for dividing the same into a plurality of compartments, said partitions terminating at the outer faces inwardly from the end faces of said other section; a closure for closing the compartments in said other section and swingably mounted on said other section and lying, upon being swung to closing position, with its outer face positioned inwardly from the outer faces of said other section; and an abutment member carried on said last named cover and projecting outwardly therefrom and adapted for engaging said second named cover upon folding of said sections into closed position.

4. In a fishing tackle box of the class described, a pair of box-like sections open at one of their ends and hingedly connected together along one of the edges of the open end and foldable upon each other to provide an enclosed container; each of said sections embodying oppositely disposed longitudinally directed side walls and oppositely disposed transversely directed end walls; a transversely directed plate mounted in one of said sections at each end thereof and engaging with the opposed face of an end wall, and of less height than the depth of said section; a longitudinally directed partition mounted in said section and engaging the inner face of each of said plates, said partition being of the same height as said plates; a plurality of transversely extending partitions in said section for dividing the same into a plurality of separate compartments, said partitions being of the same height as said plates; a cover plate swingably mounted on one of said plates and swingable to lie in engagement with the face of the other of said plates and with the faces of said partitions for closing said compartments; a box-like structure mounted on the outer face of said cover plate and positioned inwardly from the ends thereof and of the same transverse width of said section; said cover plate forming the bottom of said last-named box-like structure and projecting outwardly beyond the same at opposite ends; a plurality of partitions in said last-named box-like structure for dividing the same into a plurality of separate compartments; a swingable cover on said last-named box-like structure for closing said compartments, said cover being adapted for lying, upon swinging of said cover plate into closing position, with one face against the faces of the partitions in said last-named box-like structure and with its outer face flush with the end faces of the walls of said section.

5. In a fishing tackle box of the class described, a pair of box-like sections open at one of their ends and hingedly connected together along one of the edges of the open end and foldable upon each other to provide an enclosed container, each of said sections embodying oppositely disposed longitudinally directed side walls and oppositely disposed transversely directed end walls; a transversely directed plate mounted in one of said sections at each end thereof and engaging with the opposed face of an end wall, and of less height than the depth of said section; a longitudinally directed partition mounted in said section and engaging the inner face of each of said plates, said partition being of the same height as said plates; a plurality of transversely extending partitions in said section for dividing the same into a plurality of separate compartments, said partitions being of the same height as said plates; a cover plate swingably mounted on one of said plates and swingable to lie in engagement with the face of the other of said plates and with the faces of said partitions for closing said compartments; a box-like structure mounted on the outer face of said cover plate and positioned inwardly from the ends thereof and of the same transverse width of said section, said cover plate forming the bottom of said last-named box-like structure and projecting outwardly beyond the same at opposite ends; a plurality of partitions in said last-named box-like structure for dividing the same into a plurality of separate compartments; a swingable cover on said last-named box-like structure for closing said compartments, said cover being adapted for lying, upon swinging of said cover plate into closing position, with one face against the faces of the partitions in said last-named box-like structure and with its outer face flush with the end faces of the walls of said section; a plurality of partitions in the other of said sections for dividing the same into a plurality of compartments, said partitions being of less height than the depth of said other section; a closure for closing the compartments in said other section and swingably mounted in said other section and lying, upon being swung to closing position, with its inner face engaging the faces of the partitions in said other section and with its outer face positioned inwardly from the outer faces of the walls of said other section to provide a compartment between said cover and said enclosure.

6. In a fishing tackle box of the class described, a pair of box-like sections open at one of their ends and hingedly connected together along one of the edges of the open end and foldable upon each other to provide an enclosed container, each of said sections embodying oppositely disposed longitudinally directed side walls and oppositely disposed transversely directed end walls; a transversely directed plate mounted in one of said sections at each end thereof and engaging with the opposed face of an end wall, and of less height than the depth of said section; a longitudinally directed partition mounted in said section and engaging the inner face of each of said plates, said partition being of the same height as said plates; a plurality of transversely extending partitions in said section for dividing the same into a plurality of separate compartments, said partitions being of the same height as said plates; a cover plate swingably mounted on one of said plates and swingable to lie in engagement with the face of the other of said plates and with the faces of said partitions for closing said compartments; a box-like structure mounted on the outer face of said cover plate and positioned inwardly from the ends thereof and of the same transverse width of said section, said cover plate forming the bottom of said last-named box-like structure and projecting outwardly beyond the same at opposite ends; a plurality of partitions in said last-named box-like structure for dividing the same into a plurality of separate compartments; a swingable cover on said last-named box-like structure for closing said compartments, said cover being adapted for lying, upon swinging of said cover plate into closing position, with one face against the faces of the partitions in said last-named box-like structure and with its outer face flush with the end faces of the walls of said section; a plurality of partitions in the other of said sections for dividing the same into a plurality of compartments, said partitions being of less height than the depth of said other section; a closure for closing the compartments in said other section and swingably mounted in said other section and lying, upon being swung to closing position, with its inner face engaging the faces of the partitions in said other section and with its outer face positioned inwardly from the outer faces of the walls of said other section to provide a compartment between said cover and said enclosure; and an abutment member carried on said closure and projecting outwardly therefrom for engaging said cover plate upon folding of said sections into closed relation.

GEORGE E. MOORE.

References Cited in the file of this patent

UNITED STATES PATENTS

| Number | Name | Date |
| --- | --- | --- |
| 417,979 | Borcherdt | Dec. 24, 1889 |
| 513,044 | Handlan, Jr. | Jan. 16, 1894 |
| 908,263 | Hood | Dec. 29, 1908 |
| 1,147,077 | Collier | July 20, 1915 |
| 1,501,448 | Gorrell | July 15, 1924 |
| 1,624,714 | Bullock | Apr. 12, 1927 |
| 1,926,162 | Moberly | June 15, 1932 |
| 2,069,661 | Tiede | Feb. 2, 1937 |
| 2,290,307 | Wicker | July 21, 1942 |
| 2,441,345 | Brubaker | May 11, 1948 |
| 2,541,890 | Schaperkotter et al. | Feb. 13, 1951 |

FOREIGN PATENTS

| Number | Country | Date |
| --- | --- | --- |
| 35,475 | France | Mar. 10, 1930 |